United States Patent [19]

Doring

[11] 3,933,071

[45] Jan. 20, 1976

[54] SHEARPROOF PUNCH

[75] Inventor: Edward J. Doring, Syracuse, N.Y.

[73] Assignee: Onondaga Tool Corporation, Fayetteville, N.Y.

[22] Filed: Mar. 27, 1975

[21] Appl. No.: 562,411

[52] U.S. Cl. .................... 83/637; 83/635; 83/693
[51] Int. Cl.² .................................... B26F 1/12
[58] Field of Search ............ 83/637, 635, 693, 698, 83/916

[56] References Cited
UNITED STATES PATENTS

| | | | |
|---|---|---|---|
| 2,997,907 | 8/1961 | Constantino | 83/637 |
| 3,269,240 | 8/1966 | Killaly et al. | 83/635 X |
| 3,348,443 | 10/1967 | Smith et al. | 83/635 X |
| 3,759,130 | 9/1973 | Patterson | 83/635 X |

*Primary Examiner*—J. M. Meister
*Attorney, Agent, or Firm*—Bruns & Jenney

[57] ABSTRACT

A shearproof or notching or nibbling punch has an upper retainer member adapted to be secured to a press and a punch body. The upper body portion is adapted to be secured to the retainer member by bolt means and the lower body portion is square in cross section and has a substantially semi-cylindrical groove extending vertically along the center of each vertical face of the lower body portion. A heel for each groove has its lower portion flatted along its outer side to conform to the lower body configuration, and each heel has a cylindrical portion extending through a conforming aperture in the upper body portion and terminating in a head. Each head lies in an elongated slot in the upper body top surface, the slot being deeper than the height of the head. Springs lying in holes in the retainer member and extending into each slot bias the heels downward to project beyond the flat bottom surface of the lower body. Each heel head is flatted on diametrically opposite sides to conform its width to that of the slots to keep the heel from turning in its groove.

4 Claims, 8 Drawing Figures

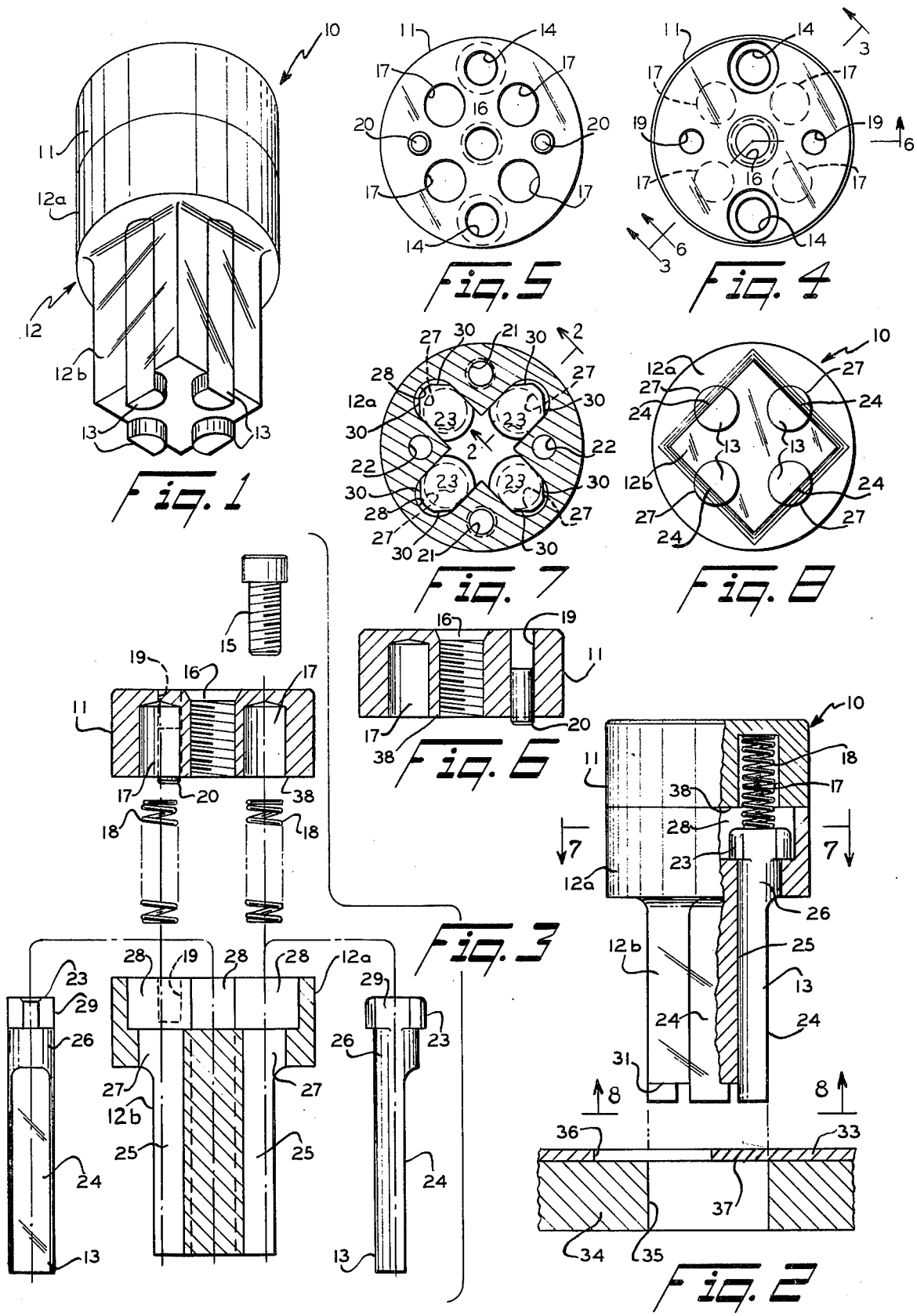

SHEARPROOF PUNCH

BACKGROUND OF THE INVENTION

This invention relates to shearproof punches which have heel elements forming part of the punch but are biased ahead of the punch to engage with the companion female die when only a portion of the punch is actually cutting for preventing transverse shearing movement of the punch with respect to the die.

Such punches are also called nibbling or notching punches and are used on relatively small presses for notching the edge or punching a hole in a metal sheet, the hole being larger than the cutting portion of the punch, by a plurality of strokes of the punch, the work being moved with respect to the punch and die between strokes or the punch and die being moved with respect to the work between strokes.

The bottom or cutting face of prior art punches have been rectangular, square, round or with rounded sides. Each punch side is provided with a vertically extending groove, usually at the center of the side in which a heel is adapted to slide. Each heel, at least along a portion of its length, is cylindrical with its outer side flatted, or rounded on a greater radius than the radius of the groove, the groove conforming to the cross-sectional slope of the cylindrical portion of the heel and the flatted or rounded face of the heel conforming to the shape of the punch side.

A spring for each heel is provided for biasing the heel downward and an upper stop is provided above each heel for limiting the upward movement of the heel and a lower stop is provided for limiting the downward movement of each heel with respect to the body of the punch. The heel may be headed to provide a shoulder for engaging this lower stop.

When a heel is raised against the upper stop because of the lower end of the heel meeting a portion of the work during a working stroke of the punch the lower working surface of the heel becomes a part of the working surface of the punch and the heel must be aligned so that its flatted or rounded side is aligned with the punch body side. Similarly, when the heel is not raised by contact with a portion of the work, its lower end enters the female die and means must be provided to keep the heel aligned and prevent it from turning so as to injure the die.

In U.S. Pat. No. 3,348,443 to Smith et al, Oct. 24, 1967, the means for preventing rotation of the heel is a circular strap guiding the arcuate outer face of the heel or four flat straps guiding the flatted side of the heel, the straps being bolted to the punch body. These straps limit the useful length of the punch, interfering with the operation of stripper mechanism, if used, and cutting down the useful life of the punch since the lower faces of the punch body and heels must be ground flat to sharpen the punch. Moreover, the strap securing bolts tend to work loose during operation of the punch.

In U.S. Pat. No. 3,742,804 to Patterson, Sept. 18, 1973, pendant spring fingers bearing inwardly extending pads with a flat surface bearing against the flatted sides of the heels are provided to keep the heels from turning. Similarly, in U.S. Pat. No. 2,997,907 to Constantino, Aug. 29, 1961, the heels themselves are provided with inwardly extending pads having a flat surface bearing against a flat surface provided on the punch body. In this type of means for preventing the turning of the heels, hardened steel punch surfaces working against unhardened surfaces cause excessive wear and rapid deterioration of the punch parts. In the latter device, bolted-on parts of the punch body tend to shake loose.

In U.S. Pat. No. 3,269,240 to Killaly et al, Aug. 30, 1966, axially extending narrow grooves are provided in the heels and spring biased aligning pins, carried in the punch body, extend into the grooves to prevent the heels from turning. This type of aligning means requires a proliferation of parts and it has been found that the narrow grooves and necessarily small aligning pins become clogged with debris under working conditions.

SUMMARY OF THE INVENTION

This invention contemplates a punch head or upper retainer member adapted to be secured to and mounted in a press and a punch body having an upper portion adapted to be secured by bolt means to the retainer member and an integral lower portion, of less width than the upper portion, and whose bottom surface has the overall general shape of the hole it is adapted to initially punch in the sheet metal work. The side surfaces of the lower body portion have the usual vertically extending, substantially semicircular grooves therein for slidingly containing the lower portion of the heels.

The upper body portion is apertured for receiving the upper cylindrical portion of the headed heels and the retainer member is adapted to house the upper portion of springs, each aligned with a heel for biasing the latter downward.

To keep the heels aligned in their grooves, the heads of the heels are flatted on two diametrically opposite sides and lie in grooves cut in the upper surface of the body upper portion. The grooves are of a width equal to the width of the heel heads between flatted sides for angularly aligning the heels and the grooves are of a depth greater than the height of the heel heads to allow the heels to be normally spring biased in advance of the cutting lower surface of the body. The grooves are of such depth that the upper surface of the heel heads are engaged by the lower surface of the retainer member around each spring when a heel engages an uncut portion of the work for aligning the bottom surface of such heel with the bottom cutting surface of the punch body.

BRIEF DESCRIPTION OF THE DRAWING

FIG. 1 is a perspective view of a punch embodying the invention as viewed from the bottom and from the side;

FIG. 2 is an exploded, fragmentary side elevational view of the punch of FIG. 1, a female die and a work piece, portions being in section on the line 2—2 of FIG. 7;

FIG. 3 is an exploded view of the punch substantially on the line 3—3 of FIG. 4, the heels being shown arbitrarily in side elevation, the one being rotated 90° from the other;

FIG. 4 is a plan view of the retainer member;

FIG. 5 is a bottom plan view of the retainer member with aligning studs in place;

FIG. 6 is a sectional view on the line 6—6 of FIG. 4;

FIG. 7 is a sectional view on the line 7—7 of FIG. 2; and

FIG. 8 is a bottom plan view of the punch.

DESCRIPTION OF THE PREFERRED EMBODIMENT

Referring to FIG. 1, the punch 10 comprises a head or retainer member 11, a punch body 12 and four heels 13. As seen in FIGS. 2 and 3, the integral body has an upper and a lower portion 12a and 12b respectively. The upper portion 12a is round and of the same diameter as the retainer 11 and the lower portion 12b is square in general line and of less width than the upper portion.

As seen in FIG. 4, retainer 11 has two counter sunk holes 14 for bolts 15, one of which is shown in FIG. 3, by which the retainer 11 may be secured to the upper body portion 12a, and a central tapped hole 16 for the usual bolt for securing a T-shaped flange, not shown, by which the retainer may be secured to a press.

As best seen in FIG. 5, retainer 11 also has four inverted wells or chambers 17, also shown in FIGS. 2 and 3, for housing springs 18, and also has two diametrically opposite holes 19 into which aligning pins 20 may be forced, as shown in FIG. 6.

Referring to FIG. 7, the body top portion 12a is provided with tapped holes 21, aligned with holes 14, for receiving the bolts 15. Also provided are holes or wells 22 for receiving the studs 20.

As best seen in FIG. 3, the heels 13 are headed at 23 and their lower portions have been flatted at 24 as is known in the art. It will be noted that the flatted portion 24 is not so extreme as to cut away material from the cylindrical leg which is flatted as far back as the axis of the leg. The grooves 25 of the lower body portion 12b are only substantially semi-cylindrical being somewhat more than semi-circular in cross section. The result is that grooves 25 restrain the lower portion of heels 13 from transverse movement out of the grooves.

There remains the problem of preventing rotation or turning of heels 13. Referring to FIGS. 2 and 3 the portion of each heel 13 above the flatted portion is cylindrical up to the head 23. This cylindrical portion 26 projects through the conforming hole 27 in the upper portion 12a of the punch and the head 23 lies in a comparatively deep slot 28 in the upper body portion 12a.

Referring to FIG. 7, two crossing slots 28,28 are provided and the heel heads are flatted at 29 (FIG. 3) on diametrically opposite sides, the flatting in this case being down to the diameter of holes 27. It will be understood that the lower punch portion 12b is only 1 inch square in the punch shown. For larger punches, four separate slots 28 may be provided. It will be noted that outer edges of the flatted heads 23 are chamfered or flatted at 30, as best seen in FIG. 7, so that the slots 28 may be shorter.

Referring to FIG. 2, it will be noted that the slots 28 are deeper than the height of the heads 23 allowing the heels 13 to normally project below the cutting surface 31 of the punch. The work 33 rests on the female die 34 which has a hole 35 therein. The work 33 already has a square hole 36 therein and the function of punch 10, when it is again lowered is to elongate the hole 36 by removing the tongue or piece of metal 37, as is well known. Heel 13 on the right in FIG. 2, first meets tongue 37 compressing the spring 18 until its heel head 23 meets a reference surface 38, the bottom of retainer 11 around the spring 18. The heel 13 on the left in FIG. 2 has then entered the hole 35 in the female die so that transverse movement or shearing of the punch is prevented when the punch cuts off the tongue 37.

It will now be apparent that there has been provided means for preventing the rotation of the heels 13 in their holes 30 and grooves 25 which is superior to that shown in any of the prior art punches. The body portion 12a is of hardened steel as are the heels 13. The flatted sides 29 of the heel heads 23 are slidingly guided by the precisely machined sides of the slots 28 to prevent rotation of the heels. It will be noted that two sides of each heel head are thus guided minimizing wear. There is no spring pressure biasing the sliding guide surfaces one against the other.

It will be apparent that the same anti-rotation means may be employed in punches of the type disclosed in the above mentioned U.S. Pat. No. 3,269,240. The heels, instead of being flatted, as at 24, may be substantially cut away giving them an arcuate surface curved about a center, the sides of the punch, on either side of the heel grooves being curved about the same center, and the radius of the curvature of these surfaces being that of the hole which the punch is designed to form as described in the above patent. Punches of other known cross-sectional shapes may also be provided with the above described slot and flatted heel head means for preventing rotation of the heels.

I claim:

1. A male shearproof punch having a retainer member adapted to be secured to a press, a unitary punch body having an upper portion removably secured to the retainer member and a lower portion having four vertically extending side surfaces, and four heels, each heel being slidably contained in a vertically extending groove in a lower body side surface and extending upward into the upper body portion, the lower body portion and the heels having flat bottom surfaces the edges therearound defining the punch cutting edge, each heel lower portion having a portion of its outer side surface cut away to conform to the configuration of the adjacent lower body side surface, wherein the improvement comprises a slot in the upper surface of the upper body portion for each heel, each heel having a head flatted on two diametrically opposite sides for sliding contact with the slot sides, each slot being of a greater depth than the heel head height, and each heel being spring-biased downward, whereby rotation of each heel is prevented and each heel is biased downward ahead of the punch body for entering a female die to cooperate with the punch body when not arrested by a workpiece in order to prevent deflection of the punch body and the heels are retractable to align their cutting edges with those of the punch body when arrested by a workpiece.

2. The male shearproof punch defined in claim 1 wherein the cutting edge defined by the edges of the lower body portion and the lower portions of the heels is rectangular.

3. The male shearproof punch defined in claim 1 wherein the cutting edge defined by the edges of the lower body portion and the lower portions of the heels is foursided with arcuate sides.

4. A male shearproof punch having a retainer member adapted to be secured to a press, a punch body having an upper portion removably secured to the retainer member and a lower portion integral with the upper portion, the lower portion having four vertically extending side surfaces and a bottom surface having cutting edges, each side surface having a vertically extending groove therein substantially at its center, and a headed heel slidably contained in each groove, each heel being spring-biased downward, the upper body portion being wider than the lower body portion and each heel extending upward through a circular hole in the upper body portion, each heel having a flat bottom surface and having its outer side flattened to conform to the outward shape of the lower body portion adjacent side surface, wherein the improvement comprises a slot in the upper surface of the upper body portion for each heel head, the heel head being flatted on two diametrically opposite sides thereof for sliding contact with the sides of the slot, each slot being of greater depth than the height of the heel head whereby each heel lower end is normally biased downward in advance of the cutting surface of the lower body bottom surface and is movable upward guided by the slot sides to a position with its head engaged against the bottom surface of the retainer member when the heel engages a workpiece portion.

* * * * *